United States Patent
Boss et al.

(12) United States Patent (10) Patent No.: US 11,261,910 B1
(45) Date of Patent: Mar. 1, 2022

(54) MULTI-LAYER LINEAR BEARING

(71) Applicant: Raytheon Company, Waltham, MA (US)

(72) Inventors: Jakob M. Boss, Tucson, AZ (US);
Michael B. Smith, Tucson, AZ (US);
William A. Wilson, Tucson, AZ (US);
Sellena M. Urias, Tucson, AZ (US);
William Straus, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/094,312

(22) Filed: Nov. 10, 2020

(51) Int. Cl.
*F16C 29/00* (2006.01)
*F16C 29/04* (2006.01)

(52) U.S. Cl.
CPC .......... *F16C 29/008* (2013.01); *F16C 29/045* (2013.01)

(58) Field of Classification Search
CPC .... F16C 29/008; F16C 29/045; F16C 29/046; F16C 29/12
See application file for complete search history.

(56) References Cited

U.S. PATENT DOCUMENTS

| | | | | |
|---|---|---|---|---|
| 1,913,365 A | * | 6/1933 | Bailey | E21B 17/1057 175/325.3 |
| 2,806,722 A | * | 9/1957 | Atkins | E04H 12/182 403/112 |
| 3,353,875 A | | 11/1967 | Karge | |
| 3,622,211 A | | 11/1971 | Mitton | |
| 3,887,247 A | * | 6/1975 | Graae | F16B 7/10 384/53 |
| 4,840,600 A | | 6/1989 | White et al. | |
| 5,011,300 A | | 4/1991 | Teramachi | |
| 5,161,897 A | | 11/1992 | Ng et al. | |

(Continued)

FOREIGN PATENT DOCUMENTS

| | | | | |
|---|---|---|---|---|
| DE | 706518 C | * | 5/1941 | ............ F16C 29/048 |
| DE | 2111481 A1 | * | 11/1972 | ............ F16C 29/045 |
| EP | 2766620 B1 | * | 2/2017 | ............ F16C 29/045 |

OTHER PUBLICATIONS

Machine Translation of DE-706518-C (Year: 1941).*

(Continued)

*Primary Examiner* — Alan B Waits
(74) *Attorney, Agent, or Firm* — Schwegman Lundberg & Woessner, P.A.

(57) ABSTRACT

A precision linear bearing is designed to minimize the points of contact, rolling and rubbing, to reduce particulates and FOD while ensuring stability and accuracy in a manner suitable for a clean room environment. The linear bearing comprises at least first and second bearing layers within a one-piece housing. Each bearing layer comprises at least three roller bearing spaced around the axial bore in a first plane within the housing, each roller bearing having an axis of rotation substantially perpendicular to the axial bore and projecting into said axial bore for engagement of a linear member extending through the axial bore. Each roller bearing suitably engages the linear member at a single point of contact. The layers are rotationally offset from one another such that the roller bearings contact different positions around the circumference of the linear member. The linear bearing may be configured to engage the inner surface of a cylindrical member.

17 Claims, 7 Drawing Sheets

(56) References Cited

U.S. PATENT DOCUMENTS

| | | | |
|---|---|---|---|
| 5,809,834 A | 9/1998 | Goldy | |
| 8,568,032 B2 | 10/2013 | Volluz et al. | |
| 2005/0180737 A1* | 8/2005 | Kurita | F16C 29/046 |
| | | | 392/418 |
| 2017/0191526 A1* | 7/2017 | Horner | F16C 29/045 |

OTHER PUBLICATIONS

Machine Translation of DE-2111481-A1 (Year: 1972).*
Machine Translation of EP-2766620-B1 (Year: 2017).*
Collins, Danielle, "What are recirculating linear bearings?", Retrieved from the internet: URL<https://www.linearmotiontips.com/faq-what-are-recirculating-linear-bearings/>. (Mar. 2, 2017), 9 pgs.

* cited by examiner

MULTI-LAYER LINEAR BEARING

GOVERNMENT LICENSE RIGHTS

This invention was made with government support under HQ0276-15-C-0003 awarded by the United States of America Department of Defense. The government has certain rights in this invention.

BACKGROUND OF THE INVENTION

Field of the Invention

This invention relates to linear bearings that provide support for linear motion in one direction, and more particularly to linear bearings that are compact, stable and clean room suitable.

Description of the Related Art

A linear-motion bearing is a bearing designed to provide free motion in one direction.

A slide bearing is the simplest type of linear-motion bearing, comprising just a bearing surface and no rolling elements. The journal i.e., the part of a linear member or shaft in contact with the bearing, slides over the bearing surface. A bushing is an independent slide bearing that is inserted into a housing to provide a bearing surface. The bushing is made from a material that provides a low friction bearing surface. The rubbing contact of the linear member with the bushing can generate particulate matter and cause foreign object damage (FOD).

Linear ball and roller bearings can be broadly divided into two categories-recirculating and non-recirculating-depending on whether or not the rolling elements actually flow (or circulate) through the bearing housing. Danielle Collins, "What are recirculating linear bearings?" www.linearmotiontips.com Mar. 2, 2017.

Non-recirculating bearings have balls or rollers that are contained in a housing and directly support a load. As the bearing moves, the rolling elements rotate about their own axes, but they do not travel within the housing. Although their basic construction principle is the same, there are several types of non-recirculating bearings, based on the type and arrangement of their rolling elements including ball bearings, flat-type roller bearings, V-type roller bearings, and cross-roller bearings. All non-recirculating bearings have a few things in common. First, the length of the bearing and the number of rolling elements limits the stroke that can be achieved. Second, because their rolling elements only rotate (no recirculation), they provide extremely smooth motion. And with machined top and bottom surfaces, they can have extremely high travel accuracy. Non-recirculating bearings are often the guide system of choice for high-precision stages and are commonly used in machine tool, precision scanning, and measuring applications.

Recirculating bearings have rolling elements that move continuously through a circuit, or path, within the bearing. This design allows the bearing to travel any distance, regardless of the bearing length. In other words, where non-recirculating bearings have limited travel, in theory, recirculating bearings have unlimited travel, constrained only by the length of the rail or shaft guideway. Recirculation does present some challenges though. First, as the balls or rollers circulate through the bearing, they move from a non load-carrying zone (sometimes referred to as the return zone) to a load-carrying zone. This variation of the balls (or rollers) from a non-loaded to a loaded state causes pulsations, which affect the bearing's travel accuracy. Recirculation also limits the maximum speed that the bearing can achieve, due to the forces created on the bearing end caps when the recirculating elements make the "turn" around the circuit.

U.S. Pat. No. 3,622,211 "Linear Roller Bearing Unit" discloses a linear motion bearing with unlimited travel distance or "stroke" without using a recirculating bearing configuration. The bearing unit is contained in a housing that surrounds the linear member to be held. In the housing are several rollers mounted in a common plane to roll longitudinally on the linear member and spaced circumferentially to hold the member securely. For simplicity of manufacture the housing is made in two similar halves, which are secured together to retain the rollers in individual confining cavities. Each roller has a concave circumferential groove of arcuate cross section for a cylindrical linear member. Matching the cross section of the roller to that of the linear member maximizes contact area, which can stabilize the linear member in light of any imperfections e.g., dents, machining defects, etc. in the surface of the member. In one form the rollers are radially adjustable by means of a setscrew in a thread hole extending radially through the housing and bearing on the yoke that holds each roller.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a precision linear bearing designed to minimize the points of contact, rolling and rubbing, to reduce particulates and foreign object damage (FOD) risk while ensuring stability and accuracy. The precision linear bearing may be configured for a clean room environment.

In an embodiment, a linear bearing comprises at least first and second bearing layers within a one-piece housing. Each bearing layer comprises at least three roller bearings spaced around the axial bore in a first plane within the housing, each roller bearing having an axis of rotation substantially perpendicular to the axial bore and projecting into said axial bore for engagement of a linear member extending through the axial bore. Each roller bearing suitably includes an inner race that is fit to a shaft that forms the axis of rotation supported between opposing walls of the housing, an outer race that projects into the axial bore to engage the linear member at a single point of contact and a plurality of ball bearings captured between the inner and outer races. The first and second bearing layers are rotationally offset by a fixed rotation angle about the axial bore such that the at least three roller bearings in the first bearing layer contact different positions around the circumference of the linear member than the at least three roller bearings in the second bearing layer.

In an embodiment for a clean-room environment, each roller bearing is sealed, the housing and roller bearings are formed of stainless steel, anodized aluminum or titanium, and the housing has a surface finish of 63 Ra (micro-inch) or better.

In an embodiment, the shaft is eccentric in which an axis that engages the inner race is offset from an axis that is rotationally accessible through a hold in the housing. Rotation moves the linear bearing radially with respect to the linear member to adjust engagement of the roller bearing.

In an embodiment, the roller bearings in the first and second layers overlap in the axial direction. The rotational offset prevents interference of the roller bearings in the different layers. In an embodiment, each layer includes 3 roller bearings spaced 120 degrees apart with a rotational offset of 60 degrees. In another embodiment, a third rotational layer includes at least three roller bearings and is rotationally offset from the second layer. The first and third layers may be aligned.

In another embodiment, the roller bearings project outward from the housing. The linear bearing is configured for engagement of an interior surface of linear cylindrical member.

In another embodiment, roller bearings project both inward into the axial bore and outward from the housing. The linear bearing is configured for engagement of either a linear member having an exterior diameter D1 extending through the axial bore or a linear cylindrical member having an interior diameter D2>D1 through which the linear bearing extends.

These and other features and advantages of the invention will be apparent to those skilled in the art from the following detailed description of preferred embodiments, taken together with the accompanying drawings, in which:

DETAILED DESCRIPTION OF THE INVENTION

A precision linear bearing is designed to minimize the points of contact, rolling and rubbing, to reduce particulates and foreign object damage (FOD) risk while ensuring stability and accuracy in a manner suitable for a clean room environment. The linear bearing comprises at least first and second bearing layers within a one-piece housing. Each bearing layer comprises at least three roller bearing spaced around the axial bore in a first plane within the housing, each roller bearing having an axis of rotation substantially perpendicular to the axial bore and projecting into said axial bore for engagement of a linear member extending through the axial bore. Each roller bearing suitably engages the linear member at a single point of contact. The layers are rotationally offset from one another such that the roller bearings contact different positions around the circumference of the linear member. The linear bearing may be configured to engage the inner surface of a cylindrical linear member.

Referring now to FIGS. 1A-1D, 2A-2B and 3 in an embodiment a linear bearing 10 is secured to a plate 12 via screws 13. Plate 12 has a through hole 14 through which a linear member 16 translates along a longitudinal axis 18.

Linear bearing 10 includes a one-piece housing 20 of short axial length with an axial bore 22. First and second bearing layers 24 and 26, each including three roller bearings 28 spaced 120° apart around axial bore 22, are positioned within housing 20. Each roller bearing has an axis of rotation 30 substantially perpendicular to the axial bore 22. The roller bearing projects into the axial bore for rolling engagement of linear member 16 extending through the axial bore.

Figure 1A:
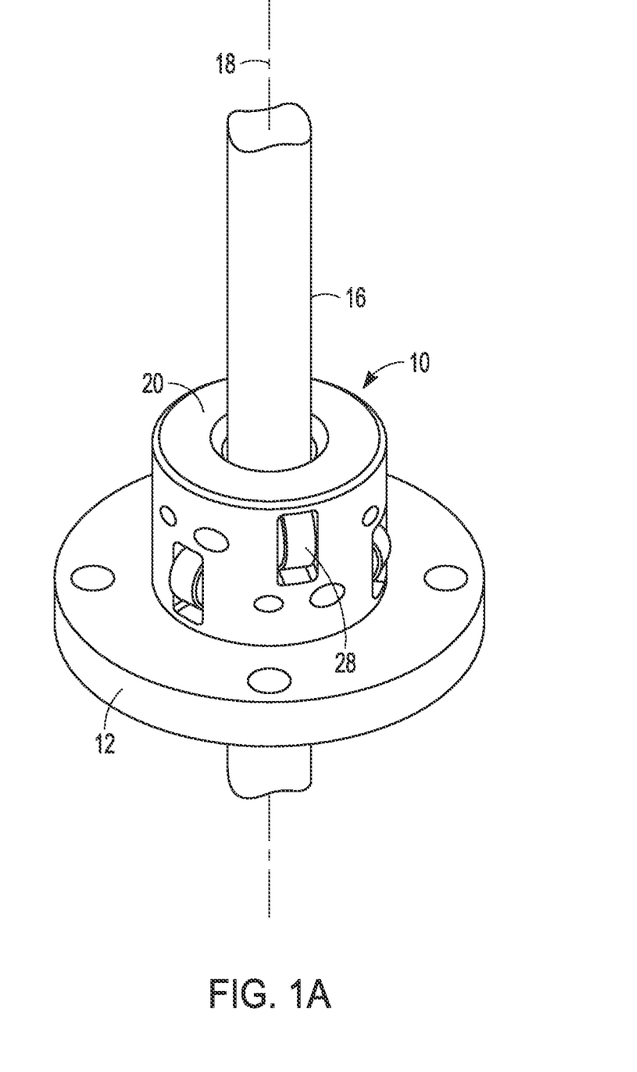
FIGS. 1A through 1D are a perspective, side, side section and top sectional views of an embodiment of a multi-layer bearing ring mounted on a platform to guide a linear member through an axial bore of the bearing ring.
Figure 1B:
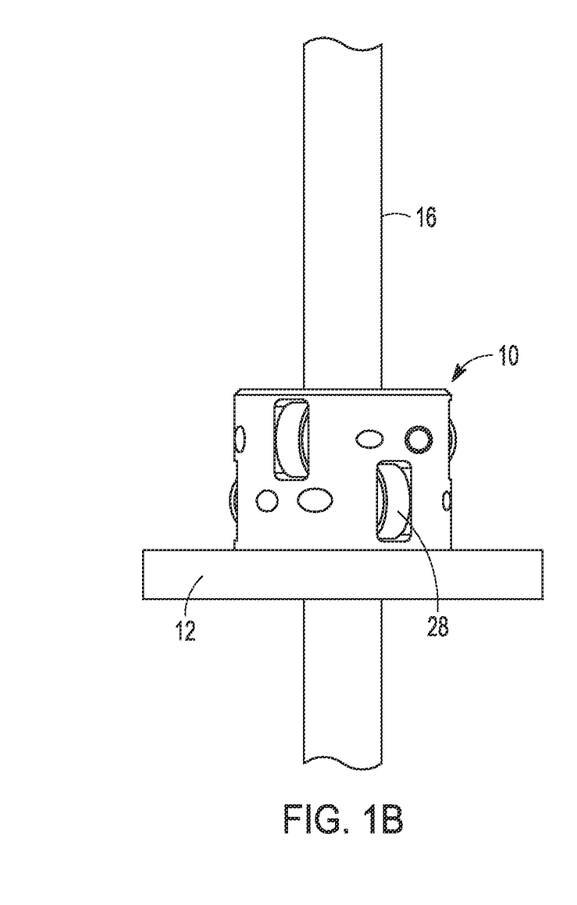
Figure 1C:
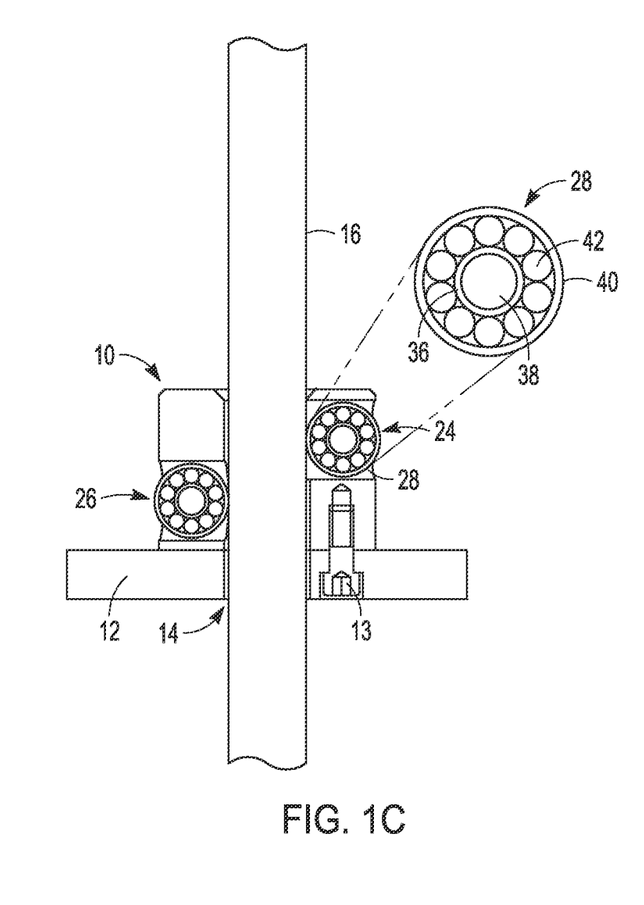
Figure 1D:
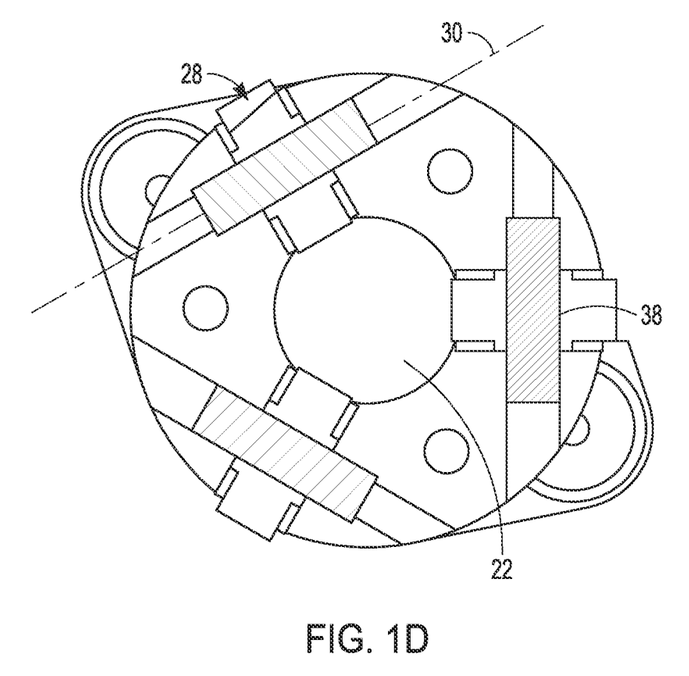

As shown, each roller bearing 28 includes an inner race 36 that is fit to a shaft 38 that forms the axis of rotation 30 supported between opposing walls of the housing 20, an outer race 40 that projects into the axial bore 22 to engage the linear member 16 and a plurality of ball bearings 42 captured between the inner and outer races. The inner race 36 is fixed. The outer race 40 rotates in a circle on ball bearings 42. The surface of the outer race 40 is suitably shaped e.g. flat, to provide a single point of contact with the surface of linear member 16. A flat outer race will contact a cylindrical surface of the linear member at a single point. A convex outer race could also provide a single point of contact.

Figure 2A:
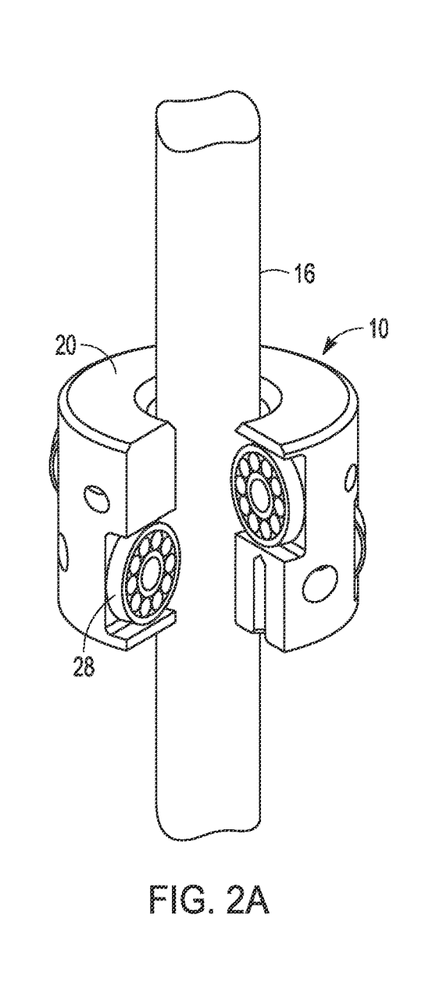
FIGS. 2A and 2B illustrate the single points of contact of the roller bearings at different positions along the linear member and around its circumference.
Figure 2B:
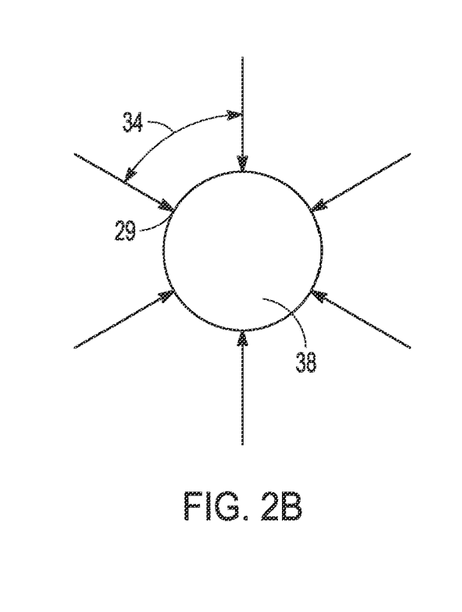

The first and second bearing layers are rotationally offset by a fixed rotation angle 34 about the axial bore 22. In this example, the rotation angle is suitably 60°, which places the roller bearings 28 in one layer directly between the roller bearings 28 in a different layer. The rotational offset serves two purposes. First, the roller bearings 28 in the adjacent layers may overlap in the axial direction. The offset prevents interference of the roller bearings. This allows for a more compact housing 10, a shorter axial length. Second, the roller bearings in the first bearing layer contact different positions 29 around the circumference of the linear member than the at least three roller bearings in the second bearing layer. This tends to improve stability and precision of the linear member 16 as it translates. In general, each layer may have N roller bearings where N is at least 3 that are suitably spaced at 360/N° in which case the offset is suitably 360/2N°. As will be discussed later, additional layers may be added to enhance precision and stability.

Figure 3:
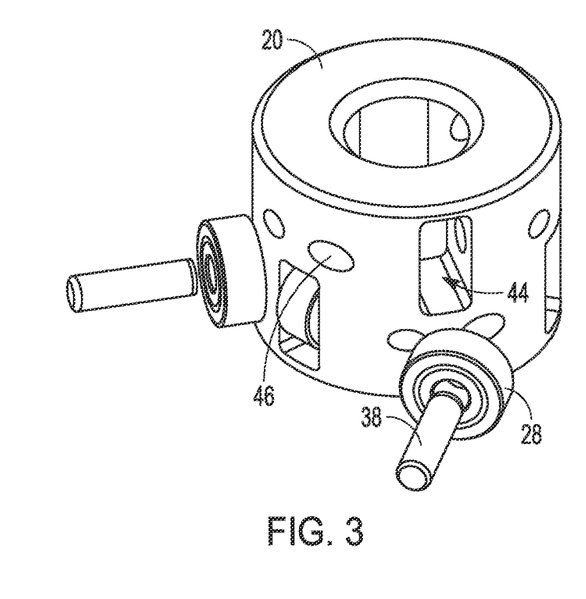
FIG. 3 is a partially exploded view of the multi-layer bearing ring showing the roller bearings and mounting shaft.

As shown in FIG. 3, three openings 44 are formed in the housing 20 in each layer and spaced 120° apart with a rotational offset of 60° between the layers. Each roller bearing 28 is placed into a corresponding opening 44. A shaft 38 is inserted through a hole 46 in the housing, through the inner race 36 and press fit against the opposing wall of the housing 20. The shaft 38 forms an interference fit with the inner race 36 so that the inner race is fixed in place.

An object of the precision linear bearing is to reduce the generation of particulates and FOD during operation as this may interfere with operation of the bearing or contaminate a clean room environment. A key aspect of the design is to minimize the points of contact, rolling and rubbing, to achieve this goal. The linear bearing includes only the one-piece housing, the roller bearings and the shaft on which the roller bearings are mounted in the housing. There should be no rubbing contact surfaces. In a given layer, the roller bearings will provide one point of contact per bearing to minimize the number of rolling points of contacts. The linear bearing must still provide precise and stable rolling support for the linear member. While in theory a single bearing layer with only 3 points of contact is sufficient, in practice precision and tilt stability degrades. The provision of a second layer including at least three roller bearings, and one that is rotationally offset to provide different points of contact around the circumference of the linear bearing improves precision and tilt stability.

As shown in this embodiment, the roller bearings 28 protrude outward from housing 20. This may be done to reduce the size of housing 20 if required for use in compact spaces. As will be described later, protrusion of the roller bearings 28 may facilitate different applications of the linear bearing 10. In an alternate configuration, the housing 20 may have a larger diameter in which case the roller bearings are entirely enclosed within the footprint of the housing.

To be compatible with operation in a clean-room environment, the design of the linear bearing with a one-piece housing, no rubbing contacts and minimal rotating points of contact is well suited to minimize particulates and FOD risk. In addition, each roller bearing is sealed, the housing and roller bearings are formed of stainless steel, anodized aluminum or titanium, and the housing has a surface finish of 63 Ra (micro-inch) or better.

Figure 4A:
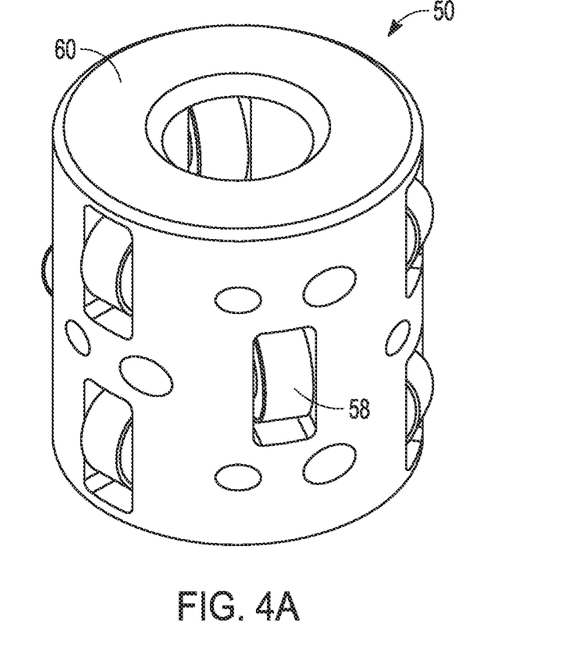
FIGS. 4A and 4B illustrate a three layer embodiment in which the roller bearings in the first and third layers are aligned.
Figure 4B:
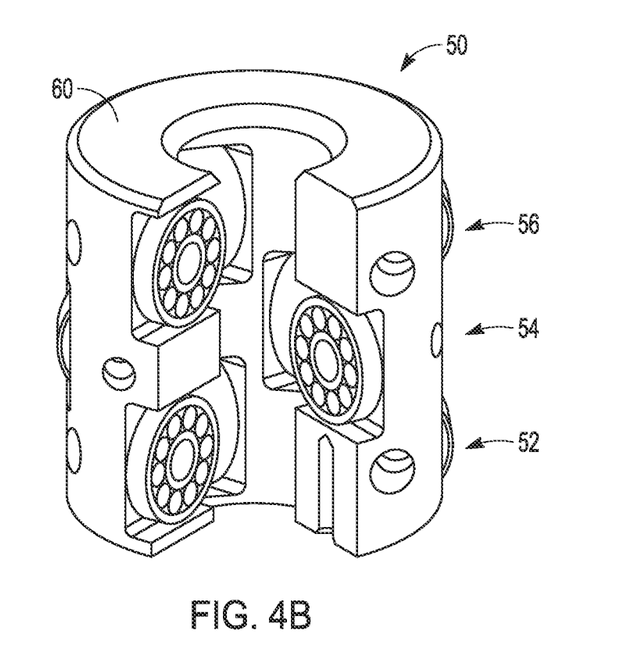

Referring now to FIGS. 4A and 4B, an embodiment of a linear bearing 50 includes first, second and third bearing layers 52, 54 and 56, respectively, each including three roller bearings 58 spaced 120° apart within a one-piece housing 60. In this configuration, the roller bearings 58 in the first and third bearing layers are aligned and the roller bearings 58 have a rotation offset of 60° with respect to those in the first and third layers. In an alternate embodiment, the roller bearings in the third layer could be positioned at a 30° or 90° offset provided there is sufficient clearance to avoid interference. The additional layer provides improved tilt stability and precision.

Figure 5A:
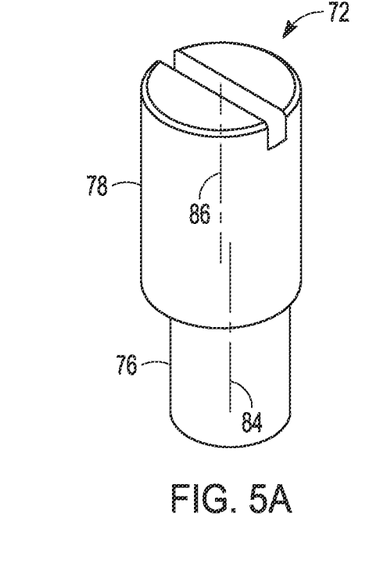
FIGS. 5A through 5C illustrate an eccentric mounting shaft for providing a degree of radial adjustment for the roller bearing.
Figure 5B:
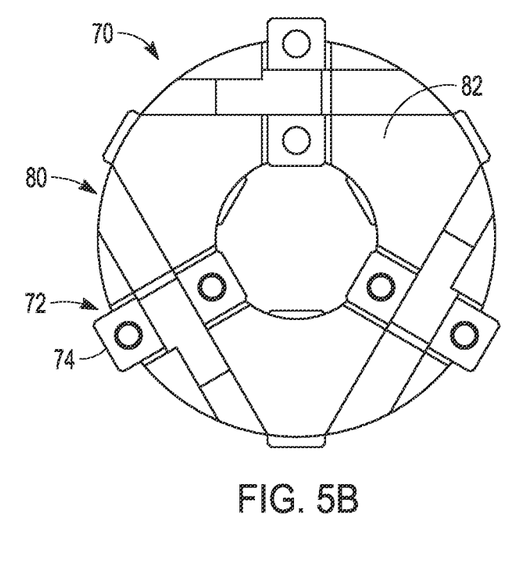
Figure 5C:
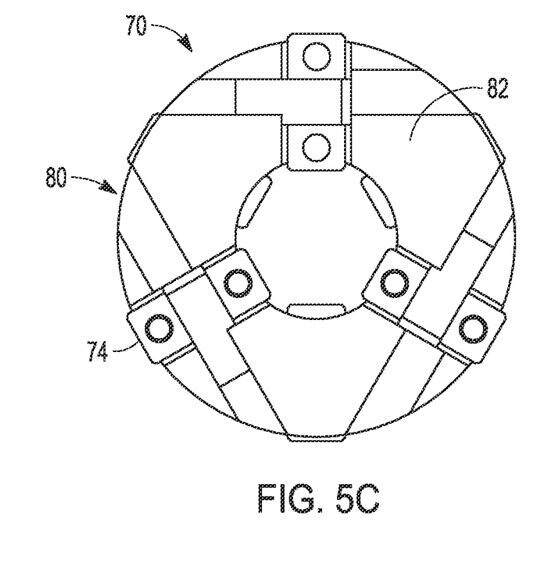

Referring now to FIGS. 5A through 5C, in an embodiment of a linear bearing 70 the mounting shaft 72 for the roller bearing 74 is formed with eccentricity to allow for radial adjustment of the roller bearing 74 to engage the linear member. Mounting shaft 72 includes a first shaft portion 76 that extends through the inner race of the roller bearing to engage the opposing wall of the housing. The first shaft portion 76 provides an interference fit that fixes the inner race. A second shaft portion 78 is rotationally accessible through a hole 80 in the housing 82. An axis 84 of the first shaft portion is offset from an axis 86 of the second shaft portion such that rotation of the second shaft portion moves the roller bear outward as shown in FIG. 5B or inward as shown in FIG. 5c.

Figure 6A:
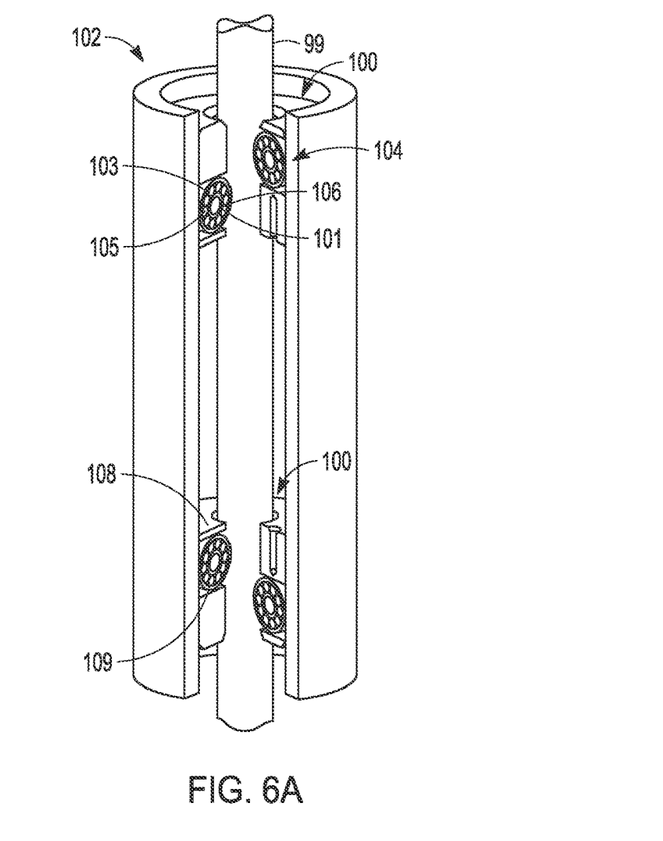
FIGS. 6A and 6B illustrate an embodiment of a multi-layer bearing ring mounted on a linear member to guide the member through an axial bore of a cylinder.
Figure 6B:
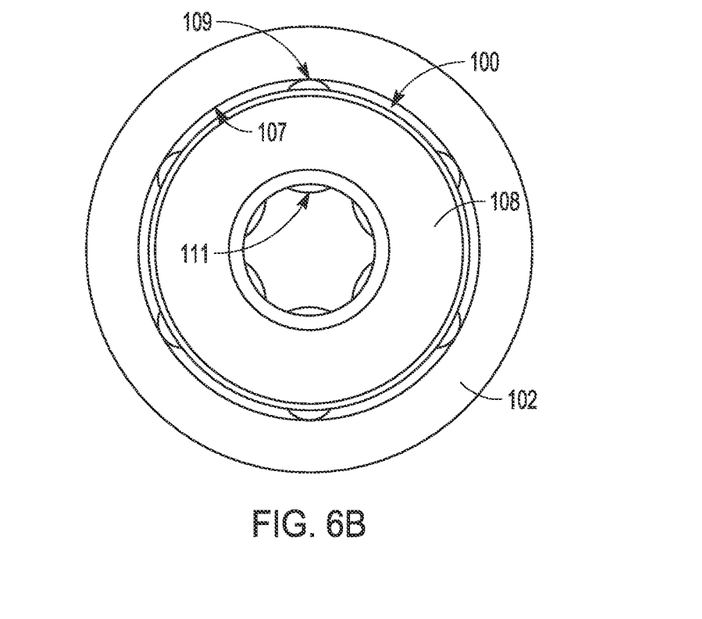

Referring now to FIGS. 6A and 6B, in an embodiment a linear bearing 100 is configured to engage the inner surface of a cylindrical linear member 102. As before, linear bearing 100 comprises at least first and second bearing layers 104 and 106 within a one-piece housing 108. Each bearing layer comprises at least three roller bearings 110 spaced around the housing. Each roller bearing has an axis of rotation substantially perpendicular to a longitudinal axis of the housing. Each roller bearing suitably includes an inner race 101 that is fit to a shaft 99 that forms the axis of rotation supported between opposing walls of the housing, an outer race 103 that projects outward through an opening in the housing to engage the cylindrical linear member and a plurality of ball bearings 105 captured between the inner and outer races. A flat outer race would contact the inner surface of the cylinder at two points of contact. If the outer race has a convex shape 111 with a smaller radius of curvature than an inner surface 107 of the cylindrical linear member 102 the outer race 103 will form a single point of contact 109 with the inner surface 107 of the cylindrical linear member 102. The first and second bearing layers are rotationally offset by a fixed rotation angle about the axial bore such that the at least three roller bearings in the first bearing layer contact different positions around the circumference of the linear member than the at least three roller bearings in the second bearing layer.

The linear bearing 100 must be mounted on linear member 102 such that the roller bearings 106 are spaced apart from the linear member 102, and thus free to rotate along the inner surface of cylindrical linear member 104. This may be accomplished by an interference fit with the internal diameter of linear bearing housing, or fastened directly to the linear bearing housing using tapped holes on either side of housing face.

As shown in the embodiments of the linear bearing, the roller bearings may be configured to protrude both inward into the axial bore of the housing and outward through the wall of the housing. Such a linear bearing may be configured to either (but not both simultaneously) engage a linear member extending through the axial bore or to engage the inner surface of a cylindrical linear member. The same linear bearing can be used for the two different applications.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A linear bearing, comprising:
   a housing having an axial bore;
   a first bearing layer comprising at least three roller bearings spaced around the axial bore in a first plane within the housing, each roller bearing having an axis of rotation substantially perpendicular to the axial bore and projecting into said axial bore for engagement of a linear member extending through the axial bore; and
   a second bearing layer above the first bearing layer in an axial direction along the axial bore, said second bearing layer comprising at least three roller bearings spaced around the axial bore in a second plane within the housing, each roller bearing having an axis of rotation substantially perpendicular to the axial bore and projecting into said axial bore for engagement of the linear member extending through the axial bore,
   wherein said first and second bearing layers are rotationally offset by a fixed rotation angle about the axial bore such that the at least three roller bearings in the first bearing layer contact different positions around the circumference of the linear member than the at least three roller bearings in the second bearing layer,
   wherein the at least three roller bearings in the first and second bearing layers overlap in the axial direction such that the top of the first bearing layer is above the bottom of the second bearing layer, wherein said rotational offset prevents interference of the roller bearings in the first and second bearing layers.

2. The linear bearing of claim 1, wherein said first and second bearing layers comprise three roller bearings spaced 120 degrees apart and rotationally offset by a fixed rotation angle of 60 degrees.

3. The linear bearing of claim 1, further comprising:
a third bearing layer above said second bearing layer, said third bearing layer comprising at least three roller bearings spaced around the axial bore in a third plane within the housing, each roller bearing having an axis of rotation substantially perpendicular to the axial bore and projecting into said axial bore for engagement of the linear member extending through the axial bore,
wherein said third bearing layer is rotationally offset by a fixed rotation angle from the second bearing layer,
wherein the at least three roller bearings in the second and third bearing layers overlap in the axial direction such that the bottom of the third bearing layer is below the top of the second bearing layer, wherein the rotational offset of the third bearing layer prevents interference of the roller bearings in the second and third bearing layers.

4. The linear bearing of claim 3, wherein said first and third bearing layers are aligned at the same rotation angle.

5. The linear bearing of claim 1, wherein each roller bearing engages the linear member at a single point of contact.

6. The linear bearing of claim 1, wherein each said roller bearing includes an inner race that is fit to a shaft that forms the axis of rotation supported between opposing walls of the housing, an outer race that projects into the axial bore to engage the linear member and a plurality of ball bearings captured between the inner and outer races.

7. The linear bearing of claim 6, wherein the shaft is eccentric with a first portion that is fit to the inner race and a second portion rotationally accessible through a hole in the housing, wherein a first axis of the first portion is offset from a second axis of the second portion such that rotation of the second portion moves the linear bearing radially with respect to the linear member to adjust engagement of the roller bearing.

8. The linear bearing of claim 6, wherein the housing is a single-piece.

9. The linear bearing of claim 1, for use in a clean-room wherein the housing is a single-piece, the roller bearings include an inner race that is fit to a shaft that forms the axis of rotation supported between opposing walls of the housing, an outer race that projects into the axial bore to provide a single point of contact with the linear member and a plurality of ball bearings captured and sealed between the inner and outer races, wherein the housing and roller bearings are formed of stainless steel, anodized aluminum or titanium, and the housing has a surface finish of 63 Ra (micro-inch) or less.

10. A linear bearing for use in a clean-room, comprising:
a single-piece housing having an axial bore;
a first bearing layer comprising at least three roller bearings spaced around the axial bore in a first plane within the housing, each roller bearing having an axis of rotation substantially perpendicular to the axial bore and projecting into said axial bore for engagement of a linear member extending through the axial bore; and
a second bearing layer comprising at least three roller bearings spaced around the axial bore in a second plane within the housing, each roller bearing having an axis of rotation substantially perpendicular to the axial bore and projecting into said axial bore for engagement of the linear member extending through the axial bore,
wherein each said roller bearing includes an inner race that is fit to a shaft that forms the axis of rotation supported between opposing walls of the housing, an outer race that projects into the axial bore to provide a single point of contact with the linear member and a plurality of ball bearings captured between the inner and outer races,
wherein the roller bearings are sealed;
wherein the housing and roller bearings are formed of stainless steel, anodized aluminum or titanium, and the housing has a surface finish of 63 Ra (micro-inch) or less.

11. The linear bearing of claim 10, wherein the shaft is eccentric with a first portion that is fit to the inner race and a second portion rotationally accessible through a hole in the housing, wherein a first axis of the first portion is offset from a second axis of the second portion such that rotation of the second portion moves the linear bearing radially with respect to the linear member to adjust engagement of the roller bearing.

12. The linear bearing of claim 10, wherein said first and second bearing layers are rotationally offset by a fixed rotation angle about the axial bore such that the at least three roller bearings in the first bearing layer contact different positions around the circumference of the linear member than the at least three roller bearings in the second bearing layer.

13. A linear bearing for use in a clean-room, comprising:
a single-piece housing having a longitudinal axis;
a first bearing layer comprising at least three roller bearings spaced around the longitudinal axis in a first plane within the housing, each roller bearing having an axis of rotation substantially perpendicular to the longitudinal axis, each said roller bearing projecting outward outside of said housing; and
a second bearing layer comprising at least three roller bearings spaced around the longitudinal in a second plane within the housing, each roller bearing having an axis of rotation substantially perpendicular to the longitudinal axis, each said roller bearing projecting outward outside of said housing,
wherein said linear bearing is configured for engagement of an inner surface of a cylindrical linear member;
wherein the roller bearings are sealed;
wherein the single-piece housing and roller bearings are formed of stainless steel, anodized aluminum or titanium, and the housing has a surface finish of 63 Ra (micro-inch) or less.

14. The linear bearing of claim 13, wherein each said roller bearing includes an inner race that is fit to a shaft that forms the axis of rotation supported between opposing walls of the housing, an outer race that projects outward to engage the inner surface of the cylindrical linear member and a plurality of ball bearings captured between the inner and outer races.

15. The linear bearing of claim 13, wherein said first and second bearing layers are rotationally offset by a fixed rotation angle about the axial bore such that the at least three roller bearings in the first bearing layer contact different positions around the circumference of the cylindrical linear member than the at least three roller bearings in the second bearing layer.

16. A linear bearing, comprising:
a housing having a longitudinal axis;
a first bearing layer comprising at least three roller bearings spaced around the longitudinal axis in a first plane within the housing, each roller bearing having an axis of rotation substantially perpendicular to the longitudinal axis, each said roller bearing projecting outward outside of said housing; and a second bearing layer comprising at least three roller bearings spaced around the longitudinal in a second plane within the housing, each roller bearing having an axis of rotation substantially perpendicular to the longitudinal axis, each said roller bearing projecting outward outside of said housing, wherein each said roller bearing includes an inner race that is fit to a shaft that forms the axis of rotation supported between opposing walls of the housing, an outer race that projects outward to engage an inner surface of a cylindrical linear member at a single point of contact and a plurality of ball bearings captured between the inner and outer races, wherein the outer race of each said roller bearing has a convex shape with a smaller radius than the cylindrical linear member to engage an inner surface of the cylindrical linear member at a single point of contact.

17. A linear bearing, comprising:

a housing having wherein bore, along longitudinal axis;
  a first bearing layer comprising at least three roller bearings spaced around the longitudinal axis in a first plane within the housing, each roller bearing having an axis of rotation substantially perpendicular to the longitudinal axis, each said roller bearing projecting outward outside of said housing and inward into the axial bore; and
  a second bearing layer comprising at least three roller bearings spaced around the longitudinal in a second plane within the housing, each roller bearing having an axis of rotation substantially perpendicular to the longitudinal axis, each said roller bearing projecting outward outside of said housing and inward into the axial bore,
  wherein the linear bearing may engage either the inner surface of a cylindrical linear member or the outer surface of a linear member extending through the axial bore.

\* \* \* \* \*

UNITED STATES PATENT AND TRADEMARK OFFICE
CERTIFICATE OF CORRECTION

| | |
|---|---|
| PATENT NO. | : 11,261,910 B1 |
| APPLICATION NO. | : 17/094312 |
| DATED | : March 1, 2022 |
| INVENTOR(S) | : Boss et al. |

Page 1 of 1

It is certified that error appears in the above-identified patent and that said Letters Patent is hereby corrected as shown below:

In the Specification

In Column 3, Line 47, delete "bearing," and insert --bearing;-- therefor In Column 4, Line 40, delete "10," and insert --20,-- therefor In Column 5, Line 51, delete "5c." and insert --5C.-- therefor In Column 6, Line 11, before "The", insert --In an embodiment, a pair of linear bearings 100 is mounted on a linear member 102 that slides back and forth within cylindrical linear member 104 or vice-versa.--

Signed and Sealed this
Nineteenth Day of July, 2022

Katherine Kelly Vidal
*Director of the United States Patent and Trademark Office*